US010546278B2

(12) United States Patent
Dreicer et al.

(10) Patent No.: US 10,546,278 B2
(45) Date of Patent: Jan. 28, 2020

(54) SYSTEM AND METHOD FOR MATCHING A CONTRIBUTOR AND A RECIPIENT ENTITY

(71) Applicant: POSIBA, INC., San Diego, CA (US)

(72) Inventors: Elizabeth S. Dreicer, San Diego, CA (US); Anders Olsson, San Diego, CA (US); Petar P. Kralev, San Diego, CA (US); Samuel Scott Beckey, San Diego, CA (US); Arnon Brouner, San Diego, CA (US); John Joseph McCarthy, San Diego, CA (US)

(73) Assignee: Capdevilla, San Diego, CA (US), Family Trust Dated June 26, 1996

( * ) Notice: Subject to any disclaimer, the term of this patent is extended or adjusted under 35 U.S.C. 154(b) by 417 days.

(21) Appl. No.: 14/338,676

(22) Filed: Jul. 23, 2014

(65) Prior Publication Data

US 2016/0026693 A1    Jan. 28, 2016

(51) Int. Cl.
| | | |
|---|---|---|
| *G06F 7/00* | (2006.01) | |
| *G06F 17/30* | (2006.01) | |
| *G06Q 20/10* | (2012.01) | |
| *G06F 16/95* | (2019.01) | |
| *G06F 16/248* | (2019.01) | |
| *G06F 17/00* | (2019.01) | |

(52) U.S. Cl.
CPC ......... *G06Q 20/102* (2013.01); *G06F 16/248* (2019.01); *G06F 16/95* (2019.01)

(58) Field of Classification Search
CPC ......... G06F 17/30861; G06F 17/30864; G06F 16/248; G06F 16/95; G06Q 20/102
See application file for complete search history.

(56) References Cited

U.S. PATENT DOCUMENTS

| | | | |
|---|---|---|---|
| 8,086,543 B2 | 12/2011 | Ghosh et al. | |
| 2004/0230524 A1* | 11/2004 | Meiners | G06Q 20/102 705/40 |
| 2005/0138062 A1* | 6/2005 | Mergenthaler | G06Q 30/02 |
| 2008/0288277 A1 | 11/2008 | Fasciano | |
| 2011/0071907 A1 | 3/2011 | Lewis | |
| 2012/0179523 A1 | 7/2012 | Ganz | |
| 2012/0185512 A1* | 7/2012 | McCully | G06Q 30/0279 707/794 |
| 2013/0151433 A1* | 6/2013 | Hicks | G06Q 30/0279 705/329 |

(Continued)

*Primary Examiner* — Kannan Shanmugasundaram
(74) *Attorney, Agent, or Firm* — Elliott, Ostrander & Preston, P.C.

(57) ABSTRACT

A system for matching entities comprising a contributor parameter system operating on a processor and configured to generate a plurality of contributor selection controls, each contributor selection control associated with one or more user-selectable parameters. A recipient parameter system operating on the processor and configured to generate a plurality of recipient input controls, each recipient input control associated with one or more user-selectable parameters. A recipient bundling system operating on the processor and configured to receive the user-selected parameters from the contributor selection controls and the user-selected parameters from the recipient input controls and to select a plurality of recipients as a function of the user-selected parameters from the contributor selection controls and the user-selected parameters from the recipient input controls.

17 Claims, 3 Drawing Sheets

(56) References Cited

U.S. PATENT DOCUMENTS

2014/0019259 A1   1/2014  Dung et al.
2014/0074665 A1*  3/2014  Stewart .............. G06Q 30/0279
                                                          705/27.1
2014/0095404 A1   4/2014  Hines
2014/0278861 A1*  9/2014  Bush ................. G06O 30/0214
                                                          705/14.16

\* cited by examiner

SYSTEM AND METHOD FOR MATCHING A CONTRIBUTOR AND A RECIPIENT ENTITY

TECHNICAL FIELD

The present disclosure relates generally to data management, and more specifically to a system and method for data management that matches entities based on user-selected parameters.

BACKGROUND OF THE INVENTION

Search tools such as the Internet have allowed entities such as contributors to locate other entities, such as charitable organizations that are seeking funds. However, the result has been that a contributor can find so many charitable organizations of interest that there is no way for the contributor to contribute to each, which results in some organizations being over-funded and others not receiving enough funds.

SUMMARY OF THE INVENTION

A system for matching entities is provided that includes a contributor parameter system that is configured to generate a plurality of contributor selection controls, where each contributor selection control is associated with one or more user-selectable parameters. A recipient parameter system is configured to generate a plurality of recipient input controls, where each recipient input control is associated with one or more user-selectable parameters. A recipient bundling system is configured to receive the user-selected parameters from the contributor selection controls and the user-selected parameters from the recipient input controls and to select a plurality of recipients as a function of the user-selected parameters from the contributor selection controls and the user-selected parameters from the recipient input controls.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views, and in which.

DETAILED DESCRIPTION OF THE INVENTION

In the description that follows, like parts are marked throughout the specification and drawings with the same reference numerals. The drawing figures might not be to scale and certain components can be shown in generalized or schematic form and identified by commercial designations in the interest of clarity and conciseness.

Figure 1:
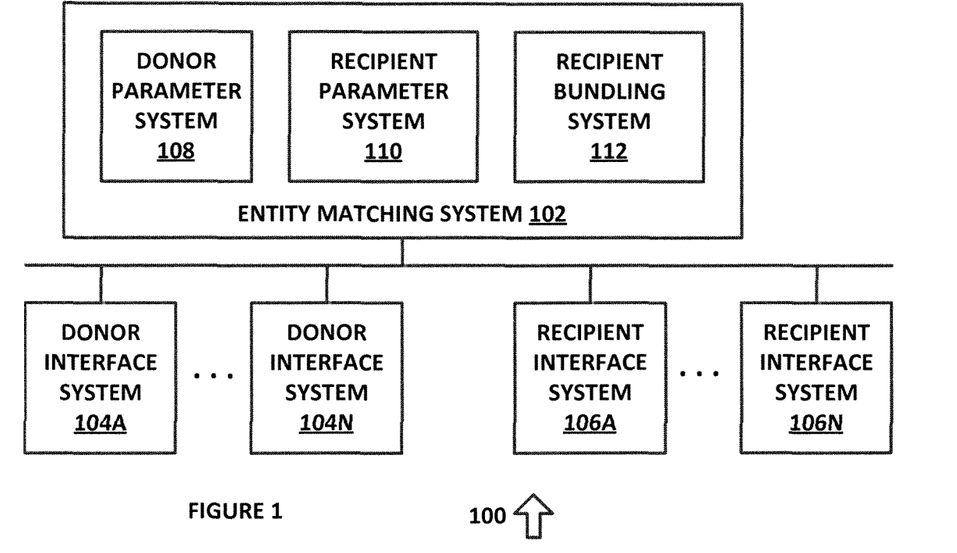
FIG. 1 is a diagram of a system for entity matching, in accordance with an exemplary embodiment of the present disclosure.

FIG. 1 is a diagram of a system 100 for entity matching, in accordance with an exemplary embodiment of the present disclosure. System 100 includes entity matching system 102, contributor parameter system 108, recipient parameter system 110, recipient bundling system 112, contributor interface systems 104A through 104N, and recipient interface systems 106A through 106N, each of which can be implemented in hardware or a suitable combination of hardware and software, and which can be one or more software systems operating on one or more processors.

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes a microcomputer or other suitable controller, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections.

Entity matching system 102 generates a plurality of user interface controls for allowing a user to access data and functionality for matching entities, such as to identify charitable organizations for donation of funds. In one exemplary embodiment, entity matching system 102 can be implemented as a website that is accessed over the Internet or other suitable networks, and can include algorithms for electronic transaction processing to allow a user to donate funds to charitable organizations, to allow charitable organizations to receive funds and for other suitable purposes.

Contributor parameter system 108 is configured to allow contributors to identify one or more functional parameters, descriptive parameters, outcome metrics or other suitable parameters for selecting charitable organizations to donate funds to. In one exemplary embodiment, users can access contributor parameter system 108 through contributor interface systems 104A through 104N, which can each be implemented using a web browser operating on a processor platform, as a smartphone or tablet computer application or in other suitable manners, and can select parameters using software-implemented check boxes, radio buttons or other suitable user interface controls. Contributor parameter system 108 can identify sets of prospective recipients that match the selected functional parameters, descriptive parameters, outcome metrics or other suitable parameters, such as by listing the matching prospective recipients in a list, and can further allow a user to edit the set, save the set, donate funds to the set and to perform other suitable functions.

Recipient parameter system 110 is configured to allow recipients to set up a profile that identifies the recipient using one or more functional parameters, descriptive parameters, outcome metrics or other suitable parameters for defining the objectives and activities of a charitable organization. In one exemplary embodiment, users can access recipient parameter system 110 through recipient interface systems 106A through 106N, which can each be implemented using a web browser operating on a processor platform, as a smartphone or tablet computer application or in other suitable manners, and can select parameters using software-implemented search tools such as pull-down lists, search engines or other suitable user interface controls. Recipient parameter system 110 can further allow a user to provide new functional parameters, descriptive parameters, outcome metrics or other suitable parameters, such as by receiving user-entered descriptions and associated data for the new parameters or metrics, by assigning the recipient profile to an agent for verification or in other suitable manners. New functional parameters, descriptive parameters, outcome metrics or other associated data can then be used to supplement the information provided to users through contributor parameter system 108.

Recipient bundling system 112 generates portfolios of recipients based on contributor profiles, funding data and other associated data, allows users to edit the generated portfolios and to donate money to the portfolios, generates user-requested reports on the portfolios and performs other suitable functions. In one exemplary embodiment, users can access recipient bundling system 112 through contributor interface systems 104A through 104N and can edit portfolios or request reports on portfolios by using suitable user interface controls.

In operation, system 100 allows contributors to find recipients and to donate to multiple recipients through a single interface, and also allows recipients to reach large groups of contributors by providing information on parameters and metrics that define the recipient and that allow the recipient to be accurately compared to other potential recipients.

Figure 2:
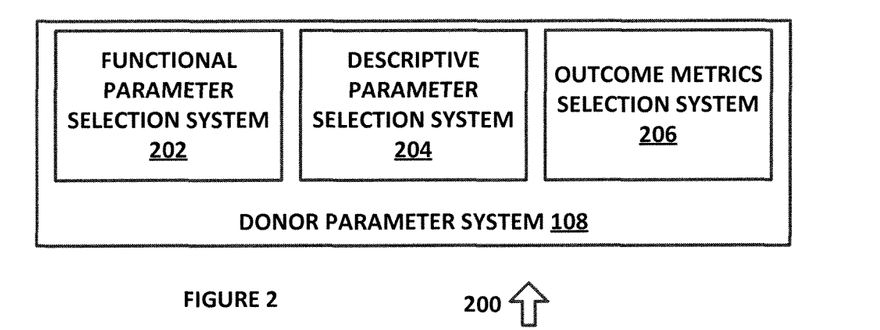
FIG. 2 is a diagram of a system for providing contributor parameter selection functionality in accordance with an exemplary embodiment of the present disclosure.

FIG. 2 is a diagram of a system 200 for providing contributor parameter selection functionality in accordance with an exemplary embodiment of the present disclosure. System 200 includes contributor parameter system 108 and functional parameter selection system 202, descriptive parameter selection system 204 and outcome metrics selection system 206, each of which can be implemented in hardware or a suitable combination of hardware and software, and which can be one or more software systems operating on one or more processors.

Functional parameter selection system 202 generates one or more user controls to allow a user to select one or more functional parameters to be included or excluded for association with one or more recipients of interest, such as charitable organizations. In one exemplary embodiment, functional parameter selection system 202 can be implemented as one or more objects, each having state and associated graphical, text and functional attributes that generate user selectable controls for displaying and selecting functional parameters for organizations, such as to identify and select organizations that perform different functions (e.g. teaching, helping the poor, helping animals, providing health care), or other suitable functional parameters. Functional parameter selection system 202 can also generate controls to allow a user to indicate whether a functional parameter is to be included or excluded. For example, a user can indicate that organizations that provide teaching should be included but that organizations that provide health care should be excluded. The functional parameters can also include relative ranges, such as a percentage of time or funds that are allocated to functional parameters, where a user can further identify desired ranges. For example, a user could specify that a desired organization should spend at least 80% of their resources on teaching and no more than 10% of their resources on providing health care. Likewise, other suitable ranges or metrics for functional parameters can also or alternatively be used.

Descriptive parameter selection system 204 generates one or more user controls to allow a user to select one or more descriptive parameters to be included or excluded for association with one or more recipients of interest, such as charitable organizations. In one exemplary embodiment, descriptive parameter selection system 204 can be implemented as one or more objects, each having state and associated graphical, text and functional attributes that generate user selectable controls for displaying and selecting descriptive parameters for organizations, such as to identify and select organizations based on the description of the organization (e.g. size, location, annual budget), or other suitable descriptive parameters. Descriptive parameter selection system 204 can also generate controls to allow a user to indicate whether a descriptive parameter is to be included or excluded. For example, a user can indicate that organizations that operate in California should be included but that organizations that operate outside of California should be excluded. The descriptive parameters can also include relative ranges, such as a percentage of time or funds that are allocated to descriptive parameters, where a user can further identify desired ranges. For example, a user could specify that a desired organization should spend at least 80% of their resources within California and no more than 10% of their resources in countries outside of the US. Likewise, other suitable ranges or metrics for descriptive parameters can also or alternatively be used.

Outcome metrics selection system 206 generates one or more user controls to allow a user to select one or more outcome metrics to be included or excluded from association with one or more recipients of interest, such as charitable organizations. In one exemplary embodiment, outcome metrics selection system 206 can be implemented as one or more objects, each having state and associated graphical, text and functional attributes that generate user selectable controls for displaying and selecting outcome metrics for organizations, such as to identify and select organizations that provide data for different outcome-related metrics (e.g. number of families housed, number of medical operations funded, pounds of food provided to the poor), or other suitable metrics. Outcome metrics selection system 206 can also generate controls to allow a user to indicate whether an outcome metric is to be included or excluded. For example, a user can indicate that organizations that provide housing to indigent families should be included but that organizations that provide food to indigent families should be excluded. The outcome metrics can also include a range of outcome metrics, where a user can further identify desired ranges. For example, a user could specify that a desired organization should find housing for more than 100 indigent families each year and should provide no more than 1000 pounds of food to indigent families each year. Likewise, other suitable ranges or quantifiers for outcome metrics can also or alternatively be used.

In operation, system 200 allows contributors to identify organizations that have or exclude user-selected functional parameters, descriptive parameters and outcome metrics, to allow users to generate portfolios of matching organizations for receiving funding. System 200 thus allows organizations to identify parameters and develop metrics that are of interest to users and that are determinative of funding, to improve the efficiency of funding charitable organizations and to help charitable organizations identify programs of interest.

Figure 3:
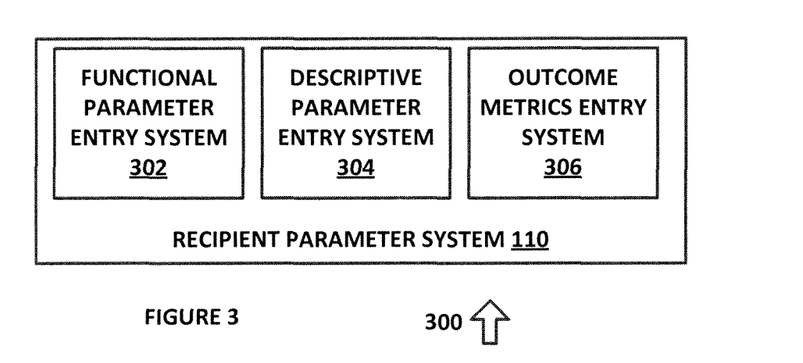
FIG. 3 is a diagram of a system for providing recipient parameter input functionality in accordance with an exemplary embodiment of the present disclosure.

FIG. 3 is a diagram of a system 300 for providing recipient parameter input functionality in accordance with an exemplary embodiment of the present disclosure. System 300 includes recipient parameter system 110 and functional parameter entry system 302, descriptive parameter entry system 304 and outcome metrics entry system 306, each of which can be implemented in hardware or a suitable combination of hardware and software, and which can be one or more software systems operating on one or more processors.

Functional parameter entry system 302 generates one or more user controls to allow a user to select one or more functional parameters associated with a specific organization, such as a charitable organization. In one exemplary embodiment, functional parameter entry system 302 can be implemented as one or more objects, each having state and associated graphical, text and functional attributes that generate user selectable controls for displaying and selecting functional parameters for the organization, such as to identify and select the functions that are performed by the organization (e.g. teaching, helping the poor, helping animals, providing health care), or other suitable functional parameters. In addition, functional parameter entry system 302 allows users to provide new functional parameters that define the functions that are provided by the organization if they do not already exist, subject to approval. If a reviewer believes that a parameter that is equivalent to the new functional parameter already exists, the user that entered the new functional parameter can be notified through a notification feature associated with an account for the organization. Likewise, if a new functional parameter is added, notifications can be provided to organizations that have already established profiles to allow them to add that function to their profile, where suitable. In addition, all new profiles can be audited to ensure that all functional parameter information is accurate.

Descriptive parameter entry system 304 generates one or more user controls to allow a user to select one or more descriptive parameters to be associated with a specific organization, such as a charitable organization. In one exemplary embodiment, descriptive parameter entry system 304 can be implemented as one or more objects, each having state and associated graphical, text and functional attributes that generate user selectable controls for displaying and selecting descriptive parameters for organizations, such as to provide predetermined descriptive identifiers for the organization (e.g. size, location, annual budget), or other suitable descriptive parameters. In addition, descriptive parameter entry system 304 allows users to provide new descriptive parameters for the organization if they do not already exist, subject to approval. If a reviewer believes that a parameter that is equivalent to the new descriptive parameter already exists, the user that entered the new descriptive parameter can be notified through the notification feature associated with the account for the organization. Likewise, if a new descriptive parameter is added, notifications can be provided to organizations that have already established profiles to allow them to add that descriptive parameter to their profile, where suitable. In addition, all new profiles can be audited to ensure that all descriptive parameter information is accurate.

Outcome metrics entry system 306 generates one or more user controls to allow a user to select one or more outcome metrics to be associated with a specific organization, such as a charitable organization. In one exemplary embodiment, outcome metrics entry system 306 can be implemented as one or more objects, each having state and associated graphical, text and functional attributes that generate user selectable controls for displaying and selecting outcome metrics for organizations, such as to provide predetermined classes of outcome-related metrics for an organization and the associated quantities (e.g. number of families housed, number of medical operations funded, pounds of food provided to the poor), or other suitable metrics. In addition, outcome metrics entry system 306 allows users to provide new outcome metrics for the organization if they do not already exist, subject to approval. If a reviewer believes that an outcome metric that is equivalent to the new outcome metric already exists, the user that entered the new outcome metric can be notified through the notification feature associated with the account for the organization. Likewise, if a new outcome metric is added, notifications can be provided to organizations that have already established profiles to allow them to add that outcome metric to their profile, where suitable. In addition, all new profiles can be audited to ensure that all provided outcome metrics information is accurate.

In operation, system 300 allows organizations to identify functional parameters, descriptive parameters and outcome metrics, to allow users to identify organizations of interest to receive funding. System 300 thus allows organizations to identify parameters and develop metrics that are of interest to users and that are determinative of funding, to improve the efficiency of funding charitable organizations and to help charitable organizations identify programs of interest.

Figure 4:
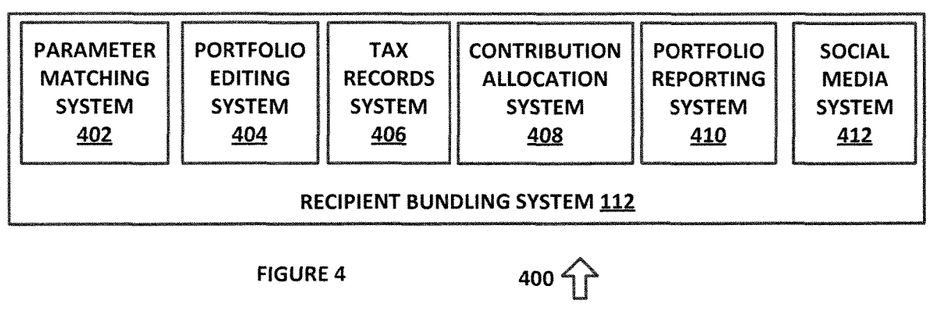
FIG. 4 is a diagram of a system for providing recipient bundling functionality in accordance with an exemplary embodiment of the present disclosure.

FIG. 4 is a diagram of a system 400 for providing recipient bundling functionality in accordance with an exemplary embodiment of the present disclosure. System 400 includes recipient bundling system 112 and parameter matching system 402, portfolio editing system 404, tax records system 406, allocation system 408, portfolio reporting system 410 and social media system 412, each of which can be implemented in hardware or a suitable combination of hardware and software, and which can be one or more software systems operating on one or more processors.

Parameter matching system 402 receives data from contributors that defines functional parameters, descriptive parameters and outcome metrics of interest to the contributors as well as associated inclusion or exclusion indicators, ranges and other associated data, and processes profile data for a plurality of recipients to generate a set of prospective recipients that meet the contributor-specified criteria. In one exemplary embodiment, a user can interactively modify parameters to increase or decrease a number of prospective recipients in the set, can apply additional search or restriction criteria to a set of prospective recipients or can otherwise modify the criteria that are used to generate the set of prospective recipients. Parameter matching system 402 can also be used to save the final set for later access.

Portfolio editing system 404 allows a user to retrieve a saved portfolio for editing, such as to update a portfolio to delete or add recipients based on new user interests, changes in recipient outcome metrics or for other suitable purposes. In one exemplary embodiment, portfolio editing system 404 can automatically save a copy of any previous portfolios that were used to provide funds to recipients, such as for tax or accounting purposes.

Tax records system 406 generates tax records for a contributor as a function of the selected recipients and amounts of funds contributed. In one exemplary embodiment, a user can identify a large number of recipients for funds and can donate an amount of funds that would be less on a per-recipient basis than the associated transaction costs for making the donation and the costs associated with reporting the donation to tax authorities and generating records of the transaction for transmittal to the contributor. The contributor funds can be added to a trust account with other contributor funds, and distributions can be made to the recipient organizations on a periodic basis, when funds reach a predetermined level or in other suitable manners. A single tax report can also be generated for each contributor that identifies the funded organizations and associated amounts, to eliminate the need for each organization to perform its own tax reporting to the individual contributors.

Allocation system 408 generates one or more user-selectable controls to allow a user to allocate a contribution to a portfolio of recipients. In one exemplary embodiment, allocation system 408 can be implemented with one or more objects, each having functional, textual and graphical attributes that allow a user to specify a predetermined percentage of a contribution that should be allocated to each of a plurality of recipients, to select one or more descriptive or functional parameters or outcome metrics for use in allocation of contributions (such as to allocate an amounts of funds on the basis of one or more identified descriptive or functional parameters or outcome metrics), or other suitable functionality. Using allocation system 408, a user can allocate funds to a group of recipients so that the recipients that are in greatest need get the most funds (e.g. based on the percentage of annual funding that each recipient has received from all other sources to date), so that the recipients that accomplish the most of a selected metric get the most funds (e.g. based on the relative percentage of housing provided for each recipient as a function of the total amount of housing provided by all recipients), or in other suitable manners. Allocation system 408 can also generate one or more user-selectable controls to allow a user to implement dynamic changes subsequent to the original allocation, including controls to add or delete specific recipients from a portfolio, controls to alter the distribution of funds and other suitable controls. In addition, a user can allow others to also contribute to a user portfolio, such as by posting the portfolio to social media system 412. The user can also stage contributions over time, such as on a weekly, monthly, quarterly or other suitable basis.

Portfolio reporting system 410 allows a user to request reports on the status of recipients in a portfolio. In one exemplary embodiment, a user can request an update for any member of a portfolio when it becomes available, a user can request a periodic report for all members of a portfolio, such as a list showing one or more outcome metrics for each recipient in a portfolio, or other suitable reports. The reports can be provided on demand, by email, or in other suitable manners. In addition, a user can post reports to social media system 412 or otherwise make the reports available to others.

Social media system 412 allows a user to post contributions, portfolios, reports or other suitable content to a social media source, such as a third party social media source (Facebook, Twitter), a social media source of system 100, email, a website or other suitable social media. In one exemplary embodiment, social media system 412 can provide search tools for allowing a user to search for social media postings, accounts, sources or other suitable social media content, such as to allow the user to provide additional social media content. In this exemplary embodiment, a user can search for a social media outlet such as a Facebook account or a Twitter account, and can request the user of that account to assist with dissemination of a report (such as by "Liking" on Facebook or "Retweeting" in Twitter). In another exemplary embodiment, a user can provide notifications through a social media source of a contribution to a portfolio and can solicit additional contributions.

Figure 5:
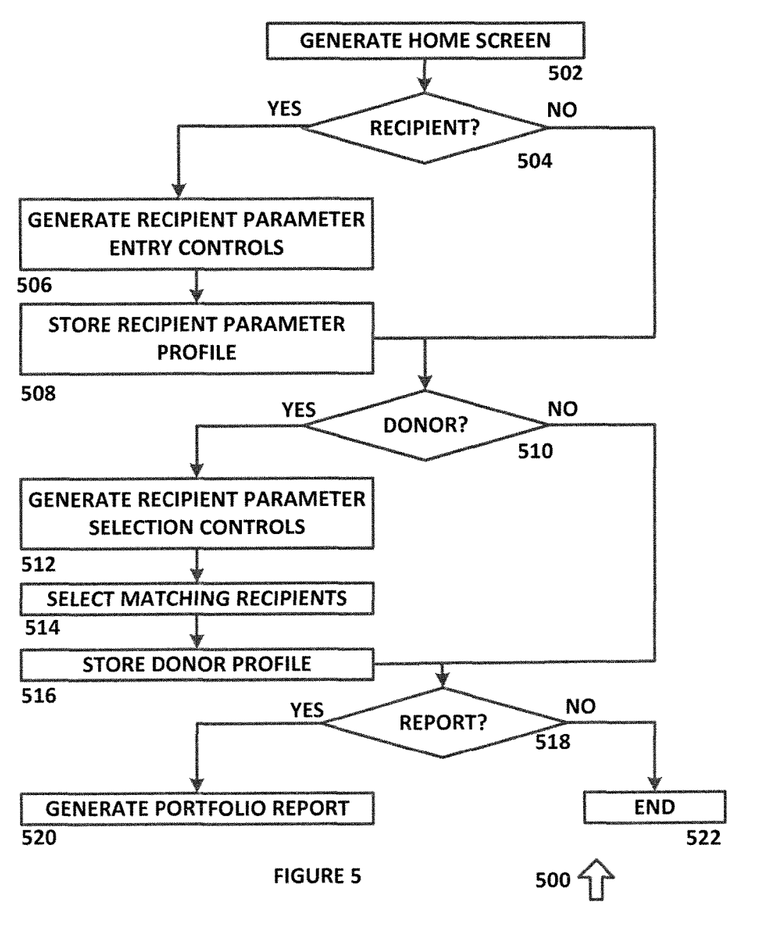
FIG. 5 is a diagram of an algorithm for entity matching, in accordance with an exemplary embodiment of the present disclosure.

FIG. 5 is a diagram of an algorithm 500 for entity matching, in accordance with an exemplary embodiment of the present disclosure. Algorithm 500 can be implemented in hardware or a suitable combination of hardware and software, and can be one or more software systems operating on one or more processors.

Algorithm 500 begins at 502, where a home screen is generated using a web browser, a dedicated application or in other suitable manners. In one exemplary embodiment, a plurality of user controls can be generated using a plurality of software objects, where each object has state and includes one or more functional, graphic and textual attributes, or in other suitable manners. The algorithm then proceeds to 504.

At 504, it is determined whether a recipient control has been activated. In one exemplary embodiment, a recipient can be prompted to create a new account with contact information, bank account information and other suitable data and can then be allowed to modify the account parameters after the account has been created. Likewise, a recipient with an existing account can be prompted to log in to the account. If it is determined that a recipient control has not been activated at 504, the algorithm proceeds to 510, otherwise the algorithm proceeds to 506.

At 506, one or more recipient parameter entry controls are generated. In one exemplary embodiment, the recipient parameter entry controls can be generated using a plurality of software objects, where each object has state and includes one or more functional, graphic and textual attributes, or in other suitable manners. The recipient parameter entry controls can include a functional parameter entry control, a descriptive parameter entry control, an outcome metrics entry control and other suitable controls. The algorithm then proceeds to 508.

At 508, the recipient parameters are stored in a profile associated with the recipient. In one exemplary embodiment, the recipient parameter entry controls can be used to enter information identifies the recipient, such as functional attributes, descriptive attributes, outcome metrics and other suitable data, in order to create a recipient profile. The recipient parameter profile can be stored as a separate data record, as separate data fields in a plurality of different data records or in other suitable manners. The algorithm then proceeds to 510.

At 510, it is determined whether a contributor control has been activated. In one exemplary embodiment, a contributor can be prompted to create a new account with contact information, bank account information and other suitable data and can then be allowed to modify the account parameters after the account has been created. Likewise, a contributor with an existing account can be prompted to log in to the account. If it is determined that a contributor control has not been activated at 510, the algorithm proceeds to 518, otherwise the algorithm proceeds to 512.

At 512, one or more contributor parameter selection controls are generated. In one exemplary embodiment, the contributor parameter selection controls can be generated using a plurality of software objects, where each object has state and includes one or more functional, graphic and textual attributes, or in other suitable manners. The contributor parameter selection controls can include a functional parameter selection control, a descriptive parameter selection control, an outcome metrics selection control, indicators as to whether selected parameters should be included or excluded, range or limit selections and other suitable controls. The algorithm then proceeds to 514.

At 514, a set of matching recipients is generated as a function of the contributor profile parameters. In one exemplary embodiment, the contributor can further narrow or expand the set of matching recipients, such as by editing the results to delete recipients, by performing additional searches and adding the results to the set or in other suitable manners. In addition, the contributor can provide funds for the portfolio through a suitable electronic fund transfer mechanism, where the funds are then stored in a trust account or in other suitable manners for subsequent distribution to the recipients. The algorithm then proceeds to 516.

At 516, the contributor parameters are stored in a profile associated with the contributor. The contributor parameter profile can be stored as a separate data record, as separate data fields in a plurality of different data records or in other suitable manners. The algorithm then proceeds to 518.

At 518, it is determined whether a reporting control has been activated. In one exemplary embodiment, a reporting control can be generated on a user interface using one or more objects, each having state and associated graphical, textual and functional attributes or in other suitable manners. If a reporting control has not been activated, the algorithm proceeds to 522 and terminates, otherwise the algorithm proceeds to 520, where a portfolio report is generated. In one exemplary embodiment, the portfolio report can allow a user to receive a tax record to document a contribution of funds to the recipients in the contributor's portfolio, to determine whether any portfolio recipients have changed functional parameters, descriptive parameters or outcome metrics since they were selected, whether new recipients are available that match the contributor's profile or other suitable conditions, where the user can modify the portfolio, store a new portfolio or perform other suitable functions.

In operation, algorithm 500 allows a contributor to identify recipient organizations for funds, and further allows the contributor to donate funds to a large number of recipients, to generate reports that identify prospective new recipients or existing recipients that have changed, or to perform other suitable functions. Although algorithm 500 is shown as a flow chart, it can also or alternatively be implemented using a state diagram, object oriented programming or in other suitable manners.

Figure 6:
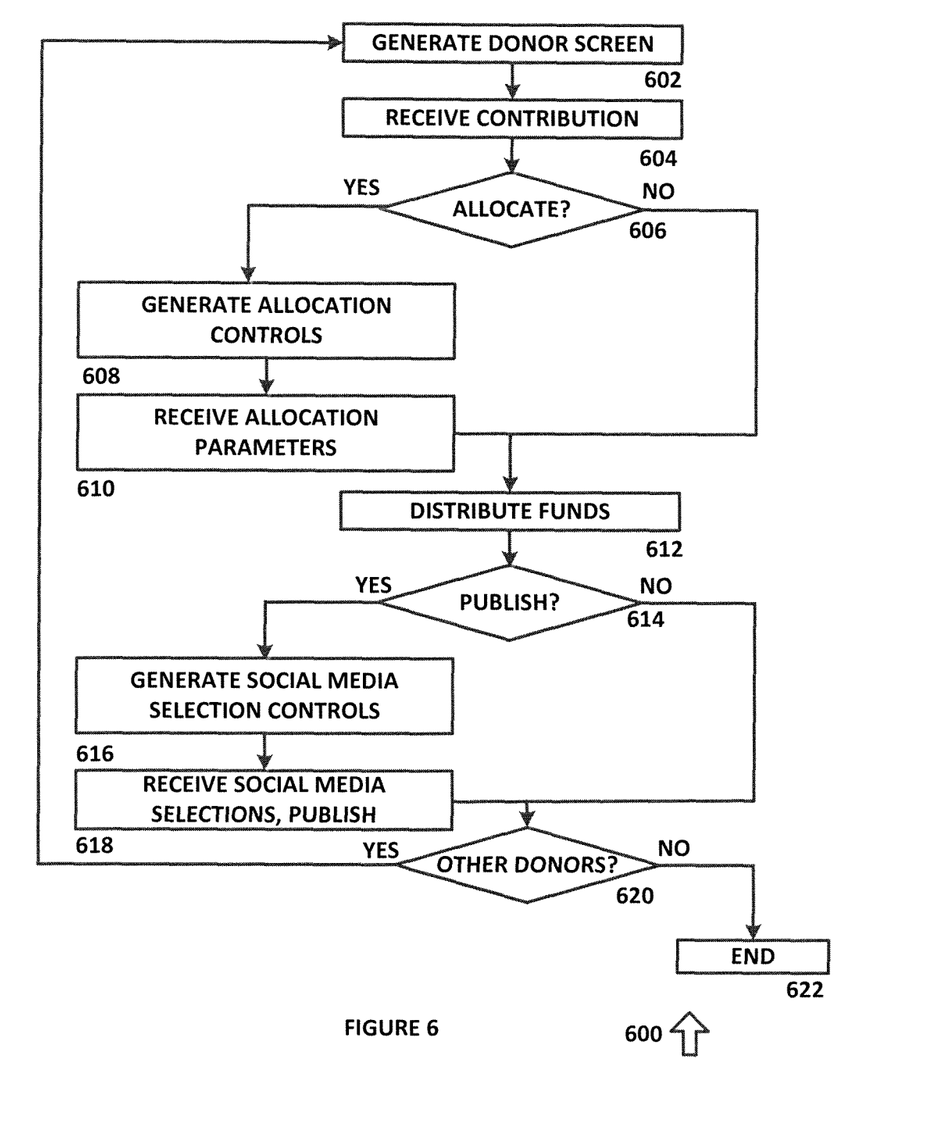
FIG. 6 is a diagram of an algorithm for contributor fund processing, in accordance with an exemplary embodiment of the present disclosure.

FIG. 6 is a diagram of an algorithm 600 for contributor fund processing, in accordance with an exemplary embodiment of the present disclosure. Algorithm 600 can be implemented in hardware or a suitable combination of hardware and software, and can be one or more software systems operating on one or more processors.

Algorithm 600 begins at 602, where a contributor selection screen is generated using a web browser, a dedicated application or in other suitable manners. In one exemplary embodiment, a plurality of user controls can be generated using a plurality of software objects, where each object has state and includes one or more functional, graphic and textual attributes, or in other suitable manners. The algorithm then proceeds to 604.

At 604, a contribution amount is received. In one exemplary embodiment, the contributor selection screen can include a control for allowing a contributor to contribute to one or more portfolios, one or more individual recipients or in other suitable manners, and a contribution amount and other associated data such as a fund source and routing data can be received. The algorithm then proceeds to 606.

At 606, it is determined whether an allocation control has been activated. In one exemplary embodiment, a contributor can be allowed to change an allocation of funds from a default allocation, such as from allocating all funds equally to giving priority to certain organizations (such as based on the amount of funds that each organization needs, the ability of an organization to generate one or more outcome metrics or other suitable parameters). If it is determined that an allocation control has not been activated at 606, the algorithm proceeds to 612, otherwise the algorithm proceeds to 608.

At 608, one or more allocation controls are generated. In one exemplary embodiment, the allocation controls can be generated using a plurality of software objects, where each object has state and includes one or more functional, graphic and textual attributes, or in other suitable manners. The allocation controls can include a control for selecting one or more descriptive parameters for allocation purposes, a control for selecting one or more functional parameters for allocation purposes, a control for selecting one or more outcome metrics for allocation purposes and other suitable controls. The algorithm then proceeds to 610.

At 610, allocation parameters are received and stored, such as by allowing a user to enter allocation percentages, by using a pull-down list, radio buttons or other suitable allocation controls. The algorithm then proceeds to 612.

At 612, the funds are distributed. In one exemplary embodiment, the funds can be distributed virtually, by increasing amounts on a balance sheet, where distributions to individual recipients are made from a general account as a function of a total amount of available funds, predetermined timetables or in other suitable manners. The algorithm then proceeds to 614.

At 614, it is determined whether to publish the contribution. In one exemplary embodiment, a contributor can elect to publish a contribution using a social media source, such as a website, an electronic messaging service or other suitable social media sources. If it is determined that the contribution should not be published, the algorithm proceeds to 620, otherwise the algorithm proceeds to 616.

At 616, one or more social media selection controls are generated. In one exemplary embodiment, the social media selection controls can be generated using a plurality of software objects, where each object has state and includes one or more functional, graphic and textual attributes, or in other suitable manners. The social media selection controls can include a text search feature, indicators as to whether selected parameters should be included or excluded, range or limit selections and other suitable controls. The algorithm then proceeds to 618.

At 618, social media selections are received and the contribution is published. In one exemplary embodiment, the publication can include a user-selectable control that allows a recipient to also donate, such as by directing the recipient to a website where algorithm 600 or a variation thereof is executed. The algorithm then proceeds to 620.

At 620, it is determined whether there are other contributors or other donations. If so, the algorithm returns to 602, otherwise the algorithm proceeds to 622 and terminates.

In operation, algorithm 600 allows a contributor to donate funds to a large number of recipients and to notify others of the donation using social media. Although algorithm 600 is shown as a flow chart, it can also or alternatively be implemented using a state diagram, object oriented programming or in other suitable manners.

Exemplary Scenarios

The following exemplary embodiments are provided of manners in which the present disclosure can be utilized. These exemplary embodiments are provided for the purposes of illustration only, and the use of the present disclosure is not limited to these exemplary embodiments or to any other exemplary embodiments disclosed herein.

Scenario 1: A contributor wants to donate a specified sum of money to fight youth violence. System 500 allows the contributor to identify top charities that match a custom criteria. In this example, the contributor can select to narrow its search to charities (1) located in Los Angeles, (2) with more than 20 employees, and (3) that have reported positive results on an outcomes metric (e.g. decrease in incidents of youth violence in their respective regions over past three years). The system identifies three charities in this example that match all of the above criteria. The contributor can then use allocation system 408 to distribute funds in proportion of 60%, 30% and 10%, corresponding to the budget size of the selected charities. The system can further allow the contributor to donate to these three charities immediately or over time. The contributor can save these charities as a portfolio, and can use portfolio reporting system 410 to periodically receive reporting information about the constituent recipients in the portfolio, can use allocation system 408 to donate to the same recipients in the future, can use social media system 412 to promote the portfolio to other contributors and can perform other suitable functions.

Scenario 2: A contributor that is relatively agnostic to a specific cause, but wants to generally help to improve the social welfare in Cook County, Ill. can use descriptive parameter selection system 204 to quickly narrow the universe of recipients by selecting the appropriate geography served (e.g. Cook County, Ill.), a descriptive parameter. The contributor can then donate a fixed amount to the selection of recipients in proportion to their size or some other factor (such as number of constituents served or number of employees) using allocation system 408. Subsequent to the original creation of the portfolio, the contributor may decide to eliminate Charity A from the portfolio, after reading in the newspaper about alleged fraud by its leader. Further, using the allocation system 408, the contributor amends its future contributions to individual recipients to be prorated based on customized collection of criteria—such as to provide for smaller charities and those with a focus on education to receive a larger weighting than previously allocated.

Scenario 3: A researcher with expertise in the area of maternal health can use outcome metrics selection system 206 to create a portfolio of recipients that are most effective in their techniques in improving maternal health. The researcher, who will be acting much like a contributor in the system, can utilize outcome metrics selection system 206 to filter out recipients that the researcher deems ineffective in their activities. The researcher can use descriptive parameter selection system 204 allocation system to limit the recipients in her custom portfolio to organizations with less than 20 employees. The researcher can then proceed to save this portfolio of recipients and include descriptions about how the portfolio was selected using social media system 412. The researcher can then proceed to (1) directly donate to the recipients in the said portfolio using allocation system 408, (2) prompt others to donate to the portfolio using social media system 412, (3) invite other researchers to comment, suggest changes to the portfolio using social media system 412 or otherwise improve on the selection of the portfolio.

Scenario 4: Contributor parameter system 108 can be used by the operator of the system or by third parties to create portfolios of recipients contributor. These pre-packaged portfolios can be published as indices in social media system 412, which can be organized as a function of descriptive parameters such as geography (southwest US, Detroit metro area, etc.) or area of focus (healthcare, education, teenage pregnancy prevention), functional parameters such as education or housing, or other suitable parameters. Contributors can directly donate to these indices, either as a one-time immediate donation through allocation system 408, as a recurring donation or a one-time donation that should be distributed to the respective selection of recipients over time through allocation system 408, or in other suitable manners.

Scenario 5: A user can use contributor parameter system 108 to create portfolios of recipients that can then be tracked over time and benchmarked against other portfolios based on outcome metrics or other reporting bases using portfolio reporting system 410. In this example, a college professor can assign a classroom project to her students where students are asked to pick 30 charitable organizations and government agencies ("recipients") that most effectively work to reduce recidivism rates. At the beginning of the projects, each student can use contributor parameter system 108 to select a unique group of 30 prospective recipients based on whatever criteria they deem relevant, such as size, location, prior outcome metrics, as long as the prospective recipients report outcome metrics for recidivism rates. At the end of the project, the professor can collect relevant reporting information on aggregate efficacy on each of the students' portfolios using portfolio reporting system 410. As such, students' portfolios can be benchmarked against each other for grading or other purposes.

Scenario 6: A user can utilize contributor parameter system 108 to provide content to one or multiple publishing platforms. In one exemplary embodiment, a user who is also a prolific blogger can utilize contributor parameter system 108 to identify like-minded news web-sites to which he would like to contribute his article on glacial movements in Greenland. Functional parameter selection system 202 and descriptive parameter selection system 204 allows the user to identify and filter out news organizations that typically do not publish freelance work, that have a bias in their coverage, that have not published news articles about the environment in the past two months or by using other suitable screening functions, such as key word screening. After a selection of news sites that are presumably more likely to publish his work is generated, the user can then send his article for review to all or a subset of these sites using allocation system 408.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A system for matching entities comprising:
   a memory that stores a plurality of recipient profiles, wherein each of the plurality of recipient profiles comprises one or more recipient parameters;
   at least one processor communicatively coupled to the memory; and
   application code instructions stored in the memory and configured to, when executed by the at least one processor,
   generate a user interface comprising a plurality of contributor selection controls, wherein each contributor selection control is configured to receive at least one user-specified parameter from a user,
   receive one or more user-specified parameters via the plurality of contributor selection controls,
   match the one or more user-specified parameters to the one or more recipient parameters in one or more of the plurality of recipient profiles,
   generate a user interface comprising selectable representations of a plurality of recipients associated with the one or more recipient profiles,
   receive a selection of a subset of the plurality of recipients associated with the one or more recipient profiles,
   save the selected subset of the plurality of recipients associated with the one or more recipient profiles as a recipient portfolio associated with the user,
   receive a selection of at least one outcome metric that indicates a measure of charity performed by a respective recipient in the recipient portfolio;
   receive a contribution amount for the recipient portfolio from the user;
   allocate the contribution amount across the selected subset of the plurality of recipients in the recipient portfolio, wherein the allocation of the contribution amount is based on at least one recipient parameter in the one or more recipient profiles associated with the selected subset of the plurality of recipients in the recipient portfolio, wherein the at least one recipient parameter comprises the selected outcome metric; and
   transfer funds from an account of the user to accounts of the selected subject of the plurality of recipients in the recipient portfolio according to the allocation.

2. The system of claim 1, wherein one or both of the one or more recipient parameters and the one or more user-specified parameters comprise a functional parameter that indicates a service performed by a recipient.

3. The system of claim 1, wherein one or both of the one or more recipient parameters and the one or more user-specified parameters comprise a descriptive parameter that indicates an attribute of a recipient.

4. The system of claim 1, wherein one or both of the one or more recipient parameters and the one or more user-specified parameters comprise the outcome metric that indicates a measure of charity performed by a recipient.

5. The system of claim 1, wherein the application code instructions are further configured to:
   receive a contribution amount for the recipient portfolio from the user;
   allocate the contribution amount across the subset of selected recipients in the recipient portfolio; and
   transfer funds from an account of the user to accounts of recipients in the recipient portfolio according to the allocation.

6. The system of claim 1, wherein the application code instructions are further configured to publish the recipient portfolio and an indication of a contribution by the user to the recipient portfolio to a social media source.

7. The method of claim 1, wherein a higher portion of the contribution amount is allocated to recipients having a higher outcome metric.

8. The method of claim 1, wherein the at least one outcome metric is selected from a plurality of available outcome metrics, and wherein the method further comprises using the at least one processor to receive a definition of one or more of the plurality of available outcome metrics from at least one user.

9. The method of claim 1, further comprising periodically transmitting reporting information regarding the at least one selected outcome metric for the recipient portfolio to the user.

10. A method for matching entities comprising using at least one processor to:
    store a plurality of recipient profiles in memory, wherein each of the plurality of recipient profiles comprises one or more recipient parameters;
    generate a user interface comprising a plurality of contributor selection controls, wherein each contributor selection control is configured to receive at least one user-specified parameter from a user;
    receive one or more user-specified parameters via the plurality of contributor selection controls;
    match the one or more user-specified parameters to the one or more recipient parameters in one or more of the plurality of recipient profiles;
    generate a user interface comprising selectable representations of a plurality of recipients associated with the one or more recipient profiles;
    receive a selection of a subset of the plurality of recipients associated with the one or more recipient profiles;
    save the selected subset of the plurality of recipients associated with the one or more recipient profiles as a recipient portfolio associated with the user;
    receive a selection of at least one outcome metric that indicates a measure of charity performed by a respective recipient in the recipient portfolio;
    receive a contribution amount for the recipient portfolio from the user;
    allocate the contribution amount across the selected subset of the plurality of recipients in the recipient portfolio, wherein the allocation of the contribution amount is based on at least one recipient parameter in the one or more recipient profiles associated with the selected subset of the plurality of recipients in the recipient portfolio, wherein the at least one recipient parameter comprises the selected outcome metric; and
    transfer funds from an account of the user to accounts of the selected subject of the plurality of recipients in the recipient portfolio according to the allocation.

11. The method of claim 10, wherein one or both of the one or more recipient parameters and the one or more user-specified parameters comprise a functional parameter that indicates a service performed by a recipient.

12. The method of claim 10, wherein one or both of the one or more recipient parameters and the one or more user-specified parameters comprise a descriptive parameter that indicates an attribute of a recipient.

13. The method of claim 10, wherein one or both of the one or more recipient parameters and the one or more user-specified parameters comprise the outcome metric that indicates a measure of charity performed by a recipient.

14. The method of claim 10, further comprising using the at least one processor to publish the recipient portfolio and an indication of a contribution by the user to the recipient portfolio to a social media source.

15. The method of claim 10, wherein a higher portion of the contribution amount is allocated to recipients having a higher outcome metric.

16. The method of claim 10, wherein the at least one outcome metric is selected from a plurality of available outcome metrics, and wherein the method further comprises using the at least one processor to receive a definition of one or more of the plurality of available outcome metrics from at least one user.

17. The method of claim 10, further comprising periodically transmitting reporting information regarding the at least one selected outcome metric for the recipient portfolio to the user.

\* \* \* \* \*